Feb. 24, 1970    W. E. RUDGE III    3,496,606
MANUFACTURE OF PLASTIC PRINTING PLATES OR THE LIKE
Original Filed Dec. 10, 1962    4 Sheets-Sheet 1
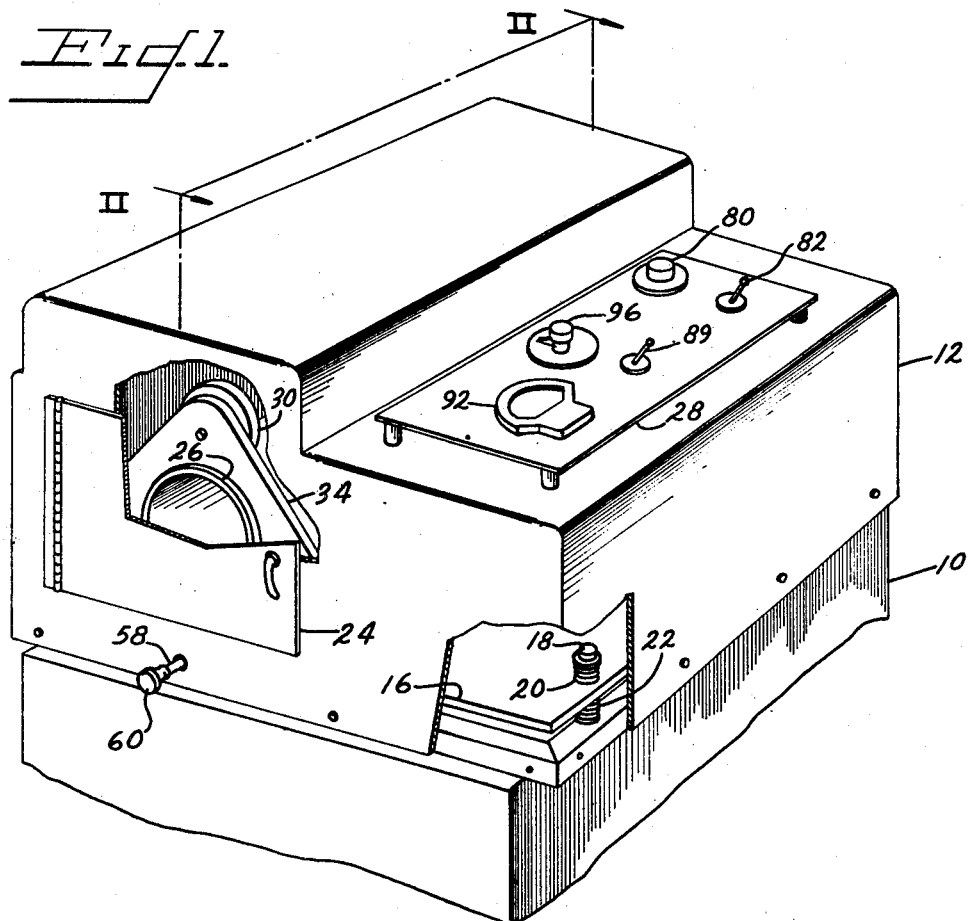
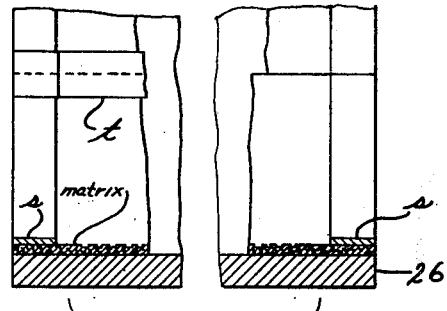
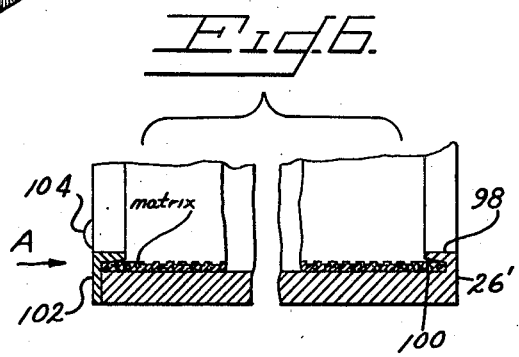
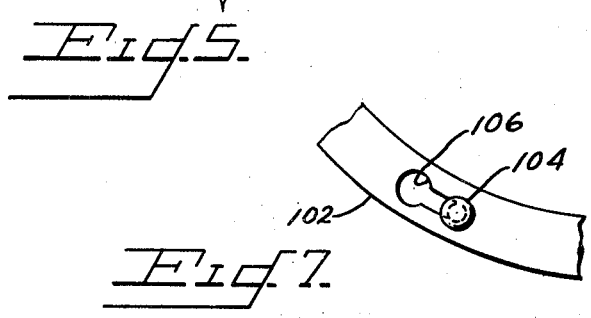
INVENTOR.
WILLIAM EDWIN RUDGE III
BY Chapin & Neal
Attorneys

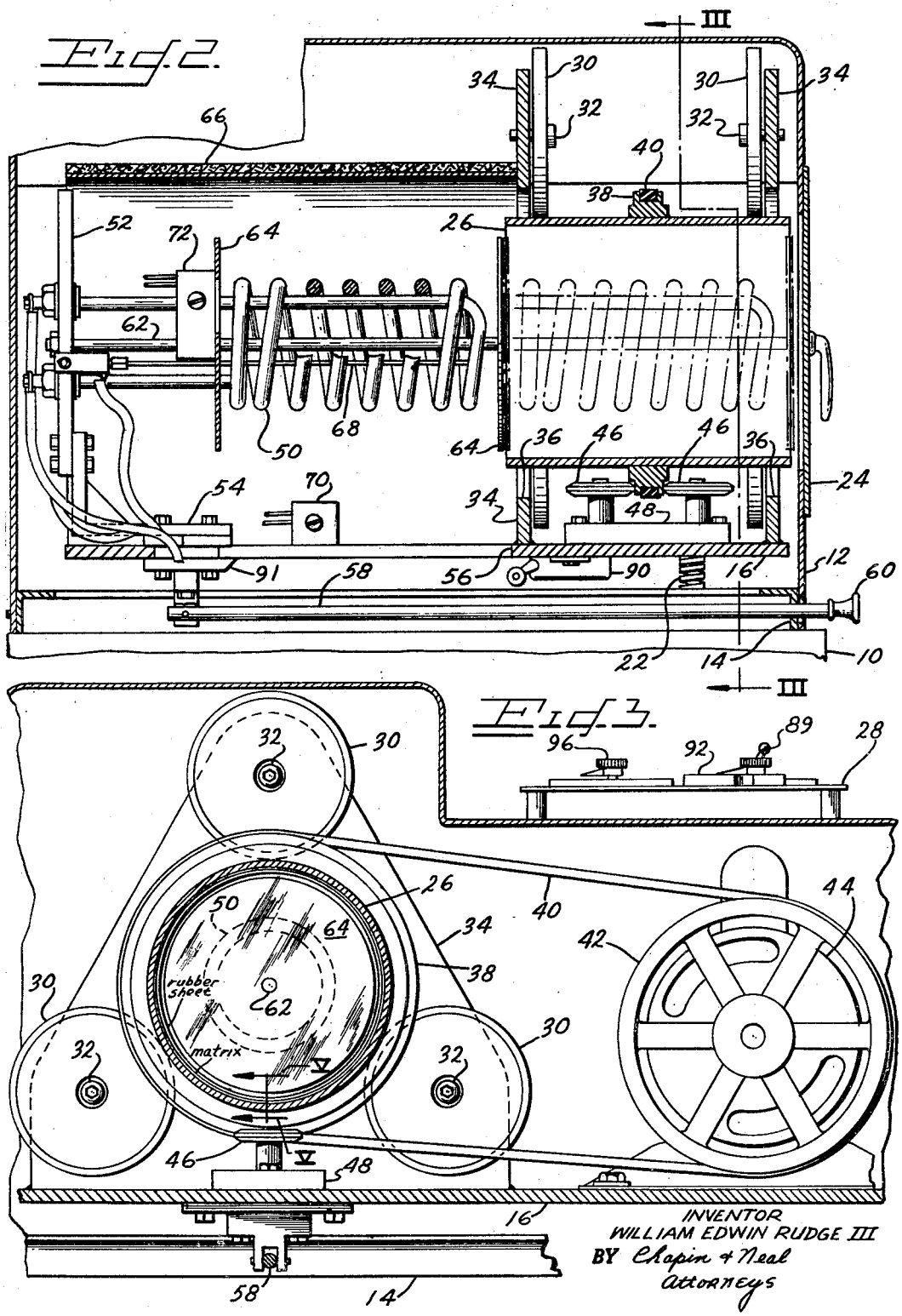

Feb. 24, 1970      W. E. RUDGE III      3,496,606

MANUFACTURE OF PLASTIC PRINTING PLATES OR THE LIKE

Original Filed Dec. 10, 1962      4 Sheets-Sheet 3

INVENTOR.
WILLIAM EDWIN RUDGE III
BY Chapin + Neal
Attorneys

Feb. 24, 1970     W. E. RUDGE III     3,496,606
MANUFACTURE OF PLASTIC PRINTING PLATES OR THE LIKE
Original Filed Dec. 10, 1962     4 Sheets-Sheet 4
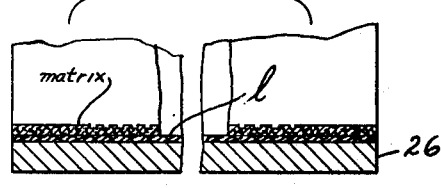
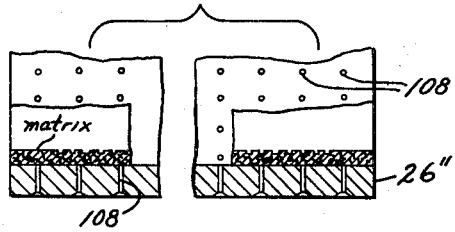
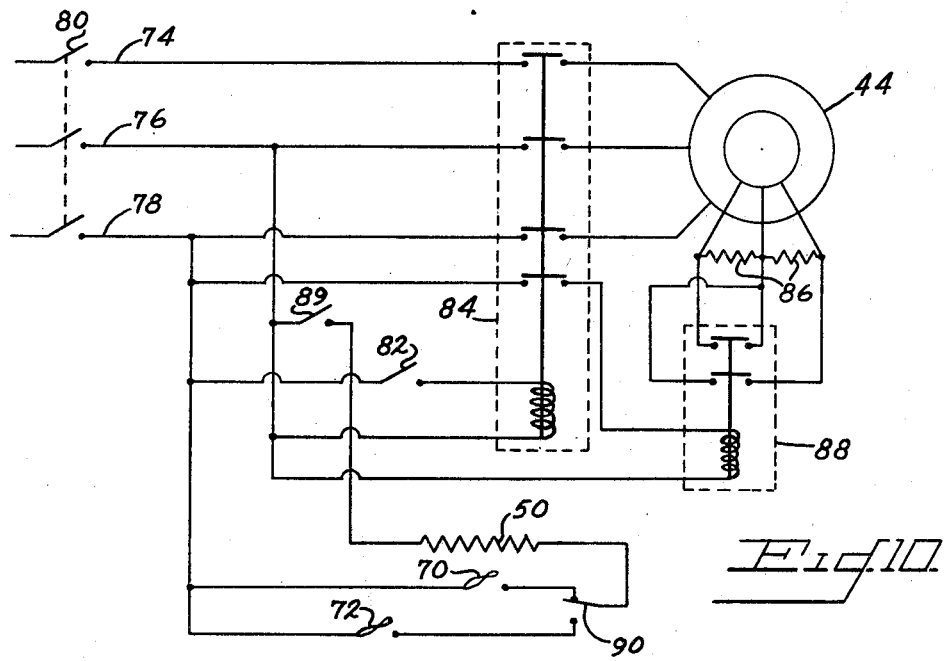
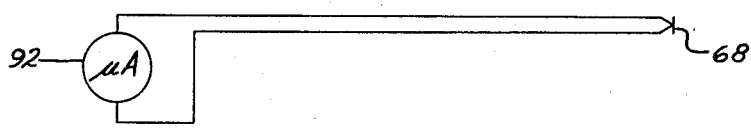
INVENTOR.
WILLIAM EDWIN RUDGE III
BY Chapin & Neal
Attorneys

United States Patent Office 3,496,606
Patented Feb. 24, 1970

3,496,606
MANUFACTURE OF PLASTIC PRINTING PLATES
OR THE LIKE
William Edwin Rudge III, 1347 Tinkham Road,
Wilbraham, Mass. 01095
Continuation of application Ser. No. 243,436, Dec. 10,
1962. This application May 9, 1966, Ser. No. 548,796
Int. Cl. B29c 5/04
U.S. Cl. 18—26      5 Claims

ABSTRACT OF THE DISCLOSURE

A method and apparatus for the centrifugal casting of printing plates using a mold positioned wtihin a rotatable drum. Heat sensitive and resinous material is placed within the mold in particulate, liquid, or sheet form. The material is drawn against the mold by rotation and caused to adopt impression of the mold by interiorly and uniformly applied heat.

In addition to being applied interiorly and uniformly, the heat is directed substantially simultaneously to all exposed regions of the material. As a result, the formation of a desired typeface is facilitated in the case of sheet material such as rubber. Moreover, in the case of flowable materials the result is a casting of substantially uniform thickness, eliminating the need for subsequent grinding. Where the cast material is sheet rubber the need for subsequent grinding is eliminated by also introducing a flowable material to produce a composite plate of substantially uniform thickness.

In an illustrative embodiment the desired heating effect is applied by an axial unit that is mounted for rapid insertion and withdrawal with respect to the drum. In addition, the heating unit has end plates so that when the unit is inserted, the plates form a substantially closed chamber with the drum. This permits intense and uniform heat to be applied and removed quickly, facilitating not only the production of printing plates but also their ready removal from the mold when the heating unit is withdrawn.

Also disclosed is the centrifugal casting of printing plates using materials of different densities. The heavier density material forms a hard and durable typeface while the lower density material forms a relatively flexible base.

---

This application is a continuation of application Ser. No. 243,436, filed Dec. 10, 1962, now abandoned.

The present invention relates to improvements in the manufacture of printing plates or the like, particularly those made of non-metallic resinous materials generally referred to as plastics or rubber.

The present invention is motivated primarily by the needs of the printing industry, but will also find utility in the manufacture of similar items.

During recent years, a very considerable amount of printing has been done by the flexography method which involves the use of thin sheet rubber printing plates. The rubber printing plates have many advantages over conventional lead stereotype plates. Notable among these advantages are better printing quality on a wider variety of materials, an increased affinity for ink which also gives better printing quality, larger press runs, lightness in weight for ease of handling and lighter, higher speed printing presses, and elimination of the costs and hazards of handling molten metal.

Flexography has not displaced stereotyping in many fields because of certain disadvantages which are also inherent in the manufacture of the flexible printing plates. Conventionally, the cost of the flexible plates is much greater than that of streotype plates. The flexography process involves forming a mold of a thermosetting resin with the printing impression therein. After curing, this mold is placed in a hydraulic press and a sheet of rubber placed thereon. The platens of the press are heated, usually by super-heated steam, so as to provide the required temperature to cure the rubber sheet as it is compressed into the mold. The rubber sheet must be maintained under pressure until it has cured. After this, it is removed from the mold and the back usually ground to assure uniform type height.

From this description it will be apparent that the cost of flexible printing plates is relatively high and a considerable time is required in their manufacture. This, plus the fact that the plate material is not re-usable, has led the newspaper industry and others to continue the use of stereotyping and other printing processes employing metal plates.

The overall object of the invention is to improve the manufacture of plastic printing plates and like articles.

A more specific object is to improve the art of flexography and make its use in all fields of printing, both practical and desirable.

Another object of the invention is to avoid the disadvantages of stereotyping and at the same time reduce the cost of and time for making printing plates used in flexography, whether such plates be flexible or semi-rigid.

A further object of the invention is to make practical the use of thermoplastic resins which may be re-used with the same or greater advantage as in melting lead plates for reuse. The use of many thermoplastic resins also has the added advantage of a saving in the cost of plate material as compared to rubber, lead, and copper which are used in conventional printing processes.

Yet another object of the invention is to attain the above ends in a manner requiring a minimum of floor space and at a minimum cost.

Still another object of the invention is to minimize, if not eliminate, the need for grinding the back face or base of flexble printing plates in order to obtain uniform type height.

The above ends are attained by introducing a mold into a drum as a liner therefor with a quantity of plastic material interiorly of said liner, the drum is rotated at a rate and under conditions such that centrifugal force will cause the plastic material to receive the impression of the mold and form a layer of substantially uniform thickness thereon. Rotation of the drum is continued under conditions permitting the plastic material to harden sufficiently to permanently retain the impression of the mold when removed therefrom.

The apparatus comprises means for rotating such a drum and means for selectively heating the plastic material within the drum in order to either cure or soften the plastic material.

The above and other related objects and features of the invention will be apparent from a reading of the following description of the disclosure found in the accompanying drawings and the novelty thereof pointed out in the appended claims.

3

In the drawings:

FIG. 1 is a perspective view of a machine embodying the present invention;

FIG. 2 is a section taken generally on line II—II in FIG. 1;

FIG. 3 is a section taken generally on line III—III in FIG. 2;

FIG. 5 is a fragmentary section taken on line V—V of FIG. 3;

FIG. 6 is a fragmentary section similar to FIG. 5 showing an alternate version of the invention;

FIG. 7 is a view looking in the direction of arrow A in FIG. 6;

FIG. 8 is a view similar to FIG. 5 illustrating an alternate feature of the invention;

FIG. 9 is a view similar to FIG. 5 illustrating a further alternate feature of the invention; and FIG. 10 is a diagrammatic illustration of the electrical system employed herein.

Figure 4:
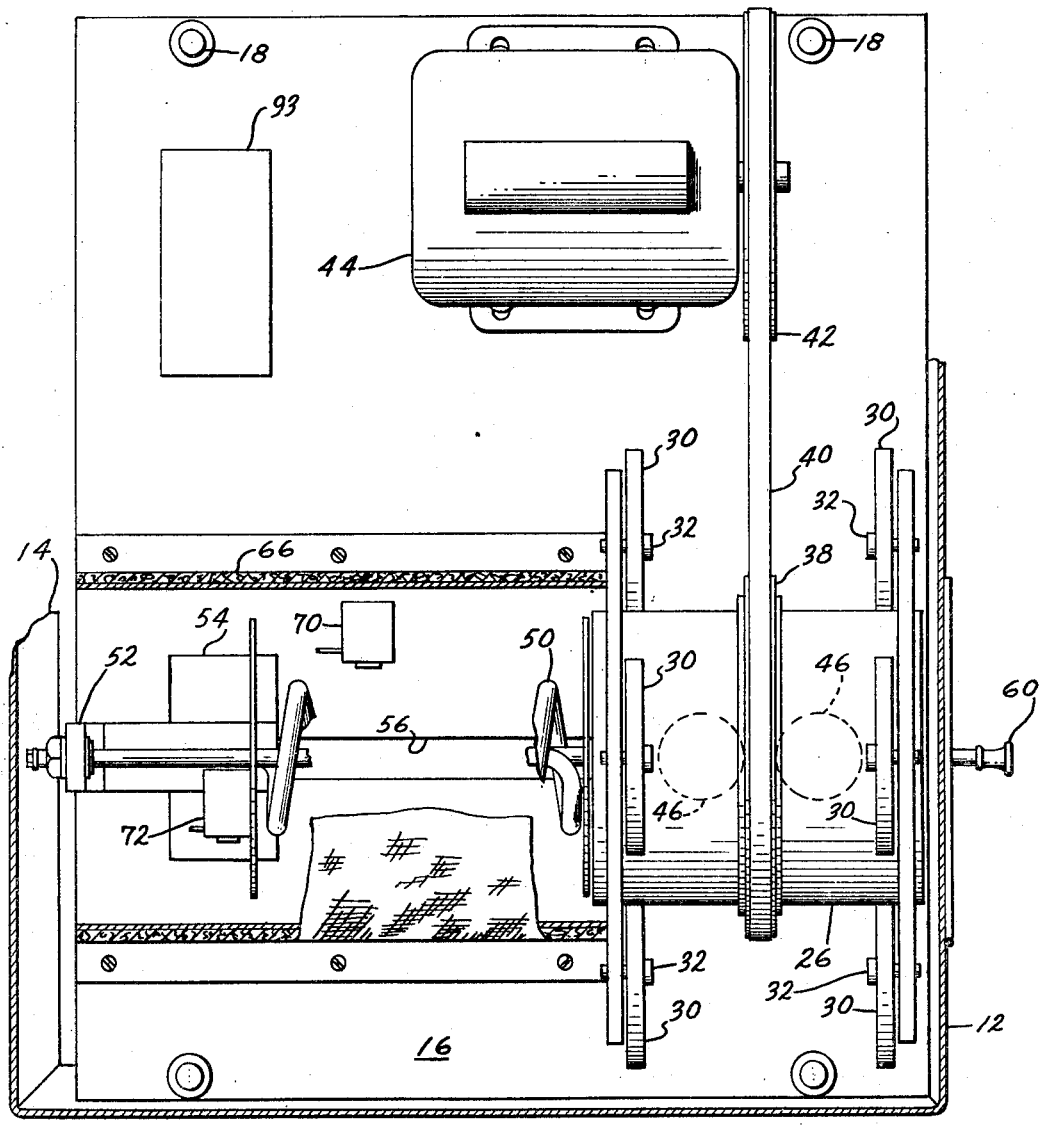
FIG. 4 is a plan view of the machine with portions broken away and others in section.

Referring to FIGS. 1-4, the principal embodiment of the invention will now be described. The apparatus herein employed in the manufacture of plastic printing plates is advantageously compact and usually requires a stand or support 10 to place it at a convenient height as will be seen in FIG. 1.

The apparatus itself comprises a sheet metal housing or cabinet 12 which is secured to a rectangular, angle iron frame 14. The main components of the apparatus are mounted on a plate 16 which is supported on the frame 14 by four floating mounts, each of which comprises a screw 18 threaded into the frame and springs 20, 22 positioned by the screw 18 on opposite sides of the plate 16. A door 24 is provided in the cabinet 12 to provide access to drum 26 (FIG. 2) which is one of the primary elements of the apparatus. An instrument panel 28 provides for mounting of various switches and dials, later discussed in connection with the electric components hereof.

Referring next to FIGS. 2-4, it will be seen that the drum 26 is mounted for rotation about its own axis by rollers 30 which are rotatably mounted on shoulder screws 32. The screws 32 are threaded into plates 34 which are secured as by welding to the main plate 16. The plates 34 are disposed at opposite ends of the drum 26 and are provided with clearance openings 36 for the drum. Preferably the rollers 30 are surfaced with a suitable nonmetallic material, such as rubber or a resin impregnated fibrous material, to minimize noise when the drum is rotating.

A pulley 38 is provided on the drum 26 preferably as a separate piece which is shrunk fit in place centrally of the drum. A belt 40 is trained around the pulley 38 and is driven by a pulley 42 secured to the output shaft of a motor 44. The motor 44 is mounted on the plate 16 and is adjustable towards and away from the drum 26 in order to obtain proper tension on the belt 40.

The drum 26 is axially positioned by a pair of rollers 46 which are rotatably mounted on a block 48 affixed to the plate 16. The rollers 46 engage opposite sides of the rim of pulley 38 and are provided with narrow peripheral faces to approximate point contact with said pulley and thus minimize wear. It is also preferable that the rollers 46 be surfaced with an appropriate non-metallic material in order to minimize noise.

A heating element in the form of an electrical resistance coil 50 is aligned with the drum 26 and is mounted in cantilever fashion on an upright post 52 which is secured to a slide 54. The slide 54 is guided by a slot 56 in the plate 16 for movement toward and away from the drum 26 to permit introduction of the heating element therein. A rod 58 is secured to the slide 54 and extends through a journal in the frame 14, with a knob 60 being secured to its outer end. By gripping the knob 60 an operator may introduce the heating element into the drum 26 or move it to its retracted position as desired.

Referring again to the heating element, it will be seen that a rod 62 extends centrally thereof and is secured to the post 52. A pair of circular plates or baffles 64 are secured to the rod 62 to control radiation from the coil 50 particularly when it is inserted into the drum 26. An insulated housing 66 is secured to the plate 16 and encloses the housing 66 in its retracted position. A thermocouple 68 is secured to the post 52 and extends within the coil 50. A first thermostat 70 is mounted on the plate 16 within the housing 66 so as to be responsive to the temperature of the coil 50 in its retracted position. A second thermostat 72 is mounted on the rear plate 64 with an opening in said plate directing radiant energy from the coil 50 directly to the thermostat 72 so that the temperature of the coil may be controlled thereby when it is introduced into the drum 26. Both of the thermostats are adjustable over a wide range.

The electrical components of the present apparatus will now be described with particular reference to FIG. 10. The motor 44 is a three-phase wound rotor motor having a maximum rate of operation of approximately 3600 r.p.m. Wires 74, 76 and 78 are connected to an appropriate source of three-phase current by a ganged switch 80 which is conveniently mounted on the control panel 26. Operation of the motor 44 is controlled by a simple "On" "Off" switch 82, also mounted on the control panel 28, which is closed to connect the coil of a relay 84 across the lines 76 and 78. The upper three contacts of the relay 84 connect the motor 44 to the wires 74, 76 and 78. At this time the motor 44 starts its operation at a relatively slow speed due to the fact that resistors 86 are connected across the rotor windings of the motor. It will be noted that the 4th set of contacts on the relay 84 connects the coil of a second relay 88 across the lines 76 and 78. The relay 88 is of the delayed-closing type so that its contacts will not close for a preset time after closure of switch 82 has initiated operation of motor 44. When the contacts of relay 88 close, they short out the resistors 86 so that the motor 44 will operate at its maximum rate. Thus the motor 44 operates at a relatively slow rate for a fairly short period of time and then automatically shifts to its maximum rate for purposes which will later be described in detail.

The electrical resistance coil 50 is connected at one end to the line 76, with two possible paths for energization of said coil being provided through either thermostat 70 or thermostat 72. A switch 89 mounted on the panel 28 is connected in the line between coil 50 and line 76 as an "On" "Off" switch. A single-pole, double-throw switch 90 is arranged to connect the coil to either of the thermostats 70 or 72. The switch 90 is mounted on the underside of plate 16 (FIG. 2) and in the retracted position of the coil connects the coil to thermostat 70. When the coil is introduced into the drum 26 slide 54 actuates switch 90 (by the beveled surface 91) connecting coil 50 with thermostat 72.

The thermocouple 66 is shown as being simply connected across a microammeter 92 which is mounted on the instrument pannel 28, though it is appreciated that more complicated circuits could be employed for greater accuracy. Microammeter 92 is mounted on the panel 28. Its dial is calibrated for direct temperature readings.

The physical location of the relays 84 and 88 and the resistances 86 is not of prime importance. For illustrative purposes a box 93 is shown on plate 16 (FIG. 4) to house these components.

Operation of the present apparatus and the method aspects of the invention will be apparent from the following description.

The initial step in operating the apparatus is preferably to close switches 80 and 89. With these switches closed the coil 50 is preheated to a temperature controlled by thermostat 70.

The described apparatus is intended primarily for the production of plastic printing plates and it is contemplated that fibrous molds will be employed which are essentially the same as stereotype matrices. Many different grades of matrices can be produced by those skilled in the art, preferably, for present purposes, a matrix will be used which is of the type that has a substantially flat back surface after the typeform impression has been molded therein.

However, when using certain plastics it will be necessary that the matrix or mold have a surface which has a disaffinity for the plastic material. Fibrous matrices are available which are coated with various compounds having the desired disaffinity. Generally speaking, any of several release agents or matrix lubricants will serve this function. These include colloidal graphite, or molybdenum disulfide dispersions, silicon emulsions or the like.

Assuming for the moment that a conventional matrix is employed. A typeform impression is formed therein in the usual manner using a hydraulic or cylinder compression press. The matrix, after being thoroughly dried, is then inserted in the drum 26 as a liner therefor (FIG. 3) with the typeform impression facing inwardly.

Next, a sheet of uncured rubber is inserted in the drum. The rubber sheet is preferably coextensive in its lateral dimensions with the matrix. Switch 82 is now closed to initiate operation of motor 44 and start the drum rotating at a relatively high rate sufficient for centrifugal force to draw the rubber material into the impression of the mold. Next, or simultaneously, the coil 50 is introduced into the rotating drum. When this is done switch 90 is actuated so that the temperature of coil 50 is now controlled by thermostat 72. The curing temperature for rubber is approximately 300° F. Since it is impractical to measure the temperature of the rubber directly, the thermostat 72 is adjusted through simple experimentation for the proper temperature to produce the desired results. Likewise, it is a simple matter to determine what temperature reading of the thermocouple 66 on the meter 92 indicates that the thermostat 72 is functioning properly. A timer 96 on the instrument panel 28 may be set to indicate the length of time needed to cure the rubber.

After a predetermined time, as indicated by the timer 96, the coil 50 is shifted to its retracted position and the switch 82 is opened to deenergize motor 44. When the drum stops rotating, the matrix is removed and the rubber sheet stripped therefrom. With the coil 50 retracted, the temperature is maintained at a lower, pre-heat temperature by thermostat 70 as switch 90 is now open.

At this point a further discussion of the centrifugal force and the heating means will be had. Operating with a drum 26 having an inside diameter of approximately 8″, it has been found that speed of rotation of roughly 3000 r.p.m. is satisfactory for all materials. Rubber requires more centrifugal force than most plastic materials. Other plastic materials which flow or mold more readily require a lesser force and thus a lesser rate of rotation. The necessary speed of rotation is also dependent on the diameter of the drum and will be less for a larger diameter and greater for a smaller diameter. The point being that the drum is simply rotated at a speed sufficient to provide the necessary centrifugal force for effective molding.

The heating coil 50 is designed to provide substantially uniform radial heat for the inner surface of the drum. The plates 64 form in combination with the drum 26 an essentially closed chamber. This facilitates conventional design of a heating coil or heating element which can provide the essentially uniform heat preferred for treating the plastic material which is being molded into printing plates. One other factor to be noted is that when the coil 50 is in its retracted position the front plate 64 serves as an insulating means which prevents overheating of the rear area of the drum 26 and permits access thereto.

It was earlier noted that the present invention relates to the manufacture of thin sheet-like printing plates formed of resinous materials generally referred to as plastics. This is to use the term "resinous" in its broadest sense and includes rubber, natural or synthetic, as well as other thermosetting plastics such as epoxies and also thermoplastic materials as the polyethylenes and polypropylenes.

Rubber is unique to the extent that it does not generally flow freely. A rubber printing plate will therefore tend to have some irregularities in its rear surface which may require that surface to be shaved or ground. Later teachings of this disclosure will, however, show how this requirement may be obviated.

Operation of the apparatus using thermoset resins such as epoxies is essentially the same as with rubber, except for certain problems which result from the fact that the uncured resin mixture when originally introduced into the drum is in a more or less freely flowable state. With this in mind, it is generally desirable to provide dams or retainers which will prevent the plastic material from flowing from the ends of the drum as it is rotated. FIG. 5 illustrates one such means wherein strips s of matrix material are simply added to the matrix itself on either side of the typeform impression. One convenient way of attaching these dams is to use tape having pressure-sensitive cement on both sides. The thickness of the printing plate will then be limited by the thickness of the dams thus provided.

In molding freely flowable plastics, it is also of importance to prevent the plastic material from flowing onto the inner surface of the drum or to flow beneath the matrix. Therefore, it is preferable that the matrix be of sufficient length that when it is folded and inserted into the drum, its opposite ends will be approximately in abutting relation. When this is done, a strip of paper or pressure sensitive tape t may be applied to the inner surface of the matrix cover to cover the point between the two ends of the matrix, as illustrated in FIG. 5. The pressure sensitive tape may also be brought up over the strips s so as to prevent leakage where they also abut.

The described matrix having the strips s and the joint between its ends covered by the tape t is introduced into the drum 26 as illustrated in FIG. 5. A quantity of viscous or semi-viscous resin mixture having a curing agent added thereto, is then placed into the drum. The drum is rotated, causing the resin mixture to spread evenly over the inner surface of the matrix, as it is flowed by centrifugal force into the typeform impression thereof. The maximum thickness of the resultant plastic printing plate is determined by the dams secured thereto.

It will also be noted that the strips provide an accurate means for controlling the width of the printing plates. Once leveled, or as the plastic material is being leveled, the heater coil 50 is introduced into the drum to facilitate the curing process. Once the resin mixture is cured sufficiently to permanently retain the impression of the typeform, the coil 50 is retracted and the matrix removed from the drum after it has ceased rotating.

FIGS. 6 and 7 illustrate another retaining or "dam" means for controlling the thickness of the plates and preventing flow of plastic from the ends of the drum. The inner end of the modified drum 26′ is provided with an inwardly projecting, integral flange 98 which has an undercut portion 100 which is preferably beveled. The rolled matrix is forced into the beveled undercut so that there will be no leakage of plastic therebetween. A removable flange 102 is attached to the front of the drum 26′ by headed pins 104 which enter bayonet slots 106 formed therein. The flange 102 also has an undercut portion 108 which again is preferably beveled to prevent leakage of plastic between it and the matrix. As in the case with all readily flowable plastics, a tape t is placed across the joint between the two ends of the matrix.

Use of the arrangement shown in FIGS. 6 and 7 is essentially the same as described before. The flange 102 is readily removed to insert and remove the matrix.

When employing thermoplastic plastic materials, either sheets or particulate forms may be used. In the case of sheets, it is possible to simply superpose a sheet of plastic having the same lateral dimensions as the matrix in the drum and then to rotate the drum and introduce the coil 50 therein. The combination of heat and centrifugal force will cause the plastic material to flow into the typeform impression of the matrix. In the case of plastic sheets, it is not necessary in all cases that the material be heated to a point where it is freely flowable. Thus the use of dams or retaining means is not absolutely essential.

However, when using thermoplastic materials such as polyethylene, it is generally expected that the material will be freely flowable during the forming of the printing plate and for that reason the use of dams and the tape t over the joint between the ends of the matrix as described in connection with FIGS. 5 and 6 is preferred. It is, of course, of greater importance when using particulate thermoplastic materials such as fluff, pellets, or granules, that the dams be used. At this point it would also be noted that many of the freely flowable materials, such as epoxies and polypropylenes in particular require a matrix which is surfaced with a material having a disaffinity for the plastic material. If not used, considerable difficulty will be encountered in releasing the finished printing plate from the matrix.

The use of plastic in particulate form as a raw material is the primary reason for providing means for initiating rotation of the drum at a relatively slow rate in order to prevent inadvertent spilling of the plastic material from the drum as it is initially accelerated. Thus, for example, with the 8" diameter drum, maximum speed is preferably in the order of 3000 r.p.m. The initial rate of rotation, as provided by the rotor resistances 86 (FIG. 10) is in the order of 300 r.p.m. This low speed is required only for a time necessary to initiate enough centrifugal force to hold the particulate material against the matrix without tumbling it from the ends of the drum. Once held in place by centrifugal force, the drum can be accelerated to its maximum rate and the coil 50 introduced therein. Slow speed rotation for 1.5 seconds is usually sufficient and the time delay relay 84 is set accordingly.

When forming printing plates of thermoplastic material, the coil 50 is shifted to its retracted position, as soon as the plastic material has been molded to the configuration of the matrix and formed a smooth inner surface. Rotation of the drum is then continued until the plastic material has cooled sufficiently to permanently retain the typeform impression which has been molded in its outer surface.

It has also been found effective to form laminated printing plates using the present apparatus. As mentioned in connection with the rubber printing plates, the back surface thereof tends to be uneven. This can be cured by laminating to that surface a freely flowable plastic material. A good example of such material is plastisol. Thus a quantity of plastisol can be introduced into the drum after the rubber sheet has been put in place. Again, using freely flowable materials, it is at least desirable that the dams or strips s and tape t previously described be used. The plastisol material will flow into the irregularities of the rubber sheet and the resultant composite printing plate will have a smooth back face or base with the typeform impression having a uniform height, thus eliminating or minimizing the grinding operation commonly associated with rubber printing plates.

Similarly, it has been found that advantageous results may be obtained by placing in the drum a matrix and then a very thin sheet of high-density polyethylene, and then a sheet of low-density polyethylene. The high-density polyethylene requires more heat and is more expensive but produces a longer lasting printing plate. The composite plate has all the advantages of a solid high-density polyethylene plate and is considerably more flexible and less expensive.

One last point to be considered is the foraminous nature of the stereotype matrices used as molds. As indicated above, it is normally contemplated that fibrous molds similar to what are employed in stereotyping would be suitable. These molds are foraminous to the extent that they comprise a substantially percentage of minute or microscopic voids. These foraminous molds have been found preferable, if not essential, in molding rubber printing plates. The rubber sheets are essentially impervious, however, air trapped between the rubber sheet and the foraminous matrix is normally compressed into the voids thereof without causing any defect in the molded typeform. On the other hand, it has also been found that impervious molds may be employed where the plastic material is heated to a point where air may pass therethrough. Thus, a plastic sheet placed on an impervious matrix would normally trap air between it and the cavities of the typeform impression in the matrix. When heated to an essentially fluid state, this trapped air will pass through the sheet plastic material due to the fact that the mass of the plastic material is much greater than the mass of the air, and consequently centrifugal force will cause the plastic material to be solidified in an air-free layer on the matrix.

It has also been found, however, that with certain types of matrices, and particularly when molding rubber printing plates, that additional venting means are desired. The drum 26 shown in FIG. 8 has a woven wire cloth liner 1 disposed between the drum and the matrix. Thus the air which would be trapped between the rubber sheet and the matrix may now pass readily from the drum instead of being compressed into the voids of the matrix. FIG. 9 illustrates another alternative approach to obtaining a better venting system wherein the drum 26" is provided with a plurality of holes 108 which vent the interior of the drum to the exterior thereof. It will thus be seen that air may pass through the matrix and through the holes 108.

Various modifications of the apparatus herein disclosed will be apparent to those skilled in the art, and it is specifically contemplated that the various operations herein described could be carried out automatically with appropriate electrical controls.

Having thus described the invention, what is claimed as novel and desired to be secured by Letters Patent of the United States is:

1. Apparatus for manufacturing printing plates comprising
    a mold with impressions thereon,
    a drum, open at both ends, interiorly receiving said mold as a liner therefor,
    means for rotating said drum to cause a heat-sensitive material placed therein to be drawn centrifugally against said mold,
    a movable heating element for substantially simultaneously and uniformly heating a majority of the exposed interior regions of the material being centrifugally drawn against said mold, and
    means for moving said heating element from a position outside one end of said drum to a position interiorly thereof.

2. Apparatus as defined in claim wherein
    said heating element is electrically energized and extends along the axis of rotation of said drum.

3. Apparatus as defined in claim 1 wherein
    the rotating means includes means for controlling the speed of rotation of said drum.

4. Apparatus as defined in claim 1 further including means for controlling the temperature of said heating element.

5. Apparatus as defined in claim 1 wherein circular plates are mounted at opposite ends of said heating element and form, in combination, with said drum a substantially closed chamber when the heating element is moved interiorly of said drum, thereby promoting a substantially uniform heating of said material.

References Cited

UNITED STATES PATENTS

| | | | |
|---|---|---|---|
| Re. 25,587 | 10/1964 | Wiltshire | 18—26 |
| 1,146,385 | 7/1915 | Aylsworth | 264—311 XR |
| 1,573,568 | 2/1926 | Nichols | 264—311 XR |
| 1,840,027 | 1/1932 | Fetter | 18—26 XR |
| 2,278,858 | 4/1942 | Fields | 18—26 |
| 2,346,784 | 4/1944 | Pollack | 18—26 XR |
| 2,994,919 | 8/1961 | Schafer et al. | 18—26 |
| 3,202,741 | 8/1965 | Gerson | 18—26 XR |
| 3,134,140 | 5/1964 | Knowles | 18—26 |
| 3,164,871 | 1/1965 | Haughton | 18—26 |
| 3,280,232 | 10/1966 | Lander | 18—26 XR |
| 3,141,193 | 7/1964 | Slemmons | 18—26 XR |

FOREIGN PATENTS

| | | |
|---|---|---|
| 15,495 | 7/1929 | Australia. |
| 551,245 | 11/1956 | Italy. |

WILLIAM J. STEPHENSON, Primary Examiner